United States Patent
Johri et al.

(10) Patent No.: US 9,126,591 B2
(45) Date of Patent: Sep. 8, 2015

(54) HYBRID VEHICLE POWERTRAIN MANAGEMENT SYSTEM AND METHOD

(71) Applicant: Ford Global Technologies, LLC, Dearborn, MI (US)

(72) Inventors: Rajit Johri, Ann Arbor, MI (US); Mark Steven Yamazaki, Canton, MI (US); Wei Liang, Farmington Hills, MI (US); Xiaoyong Wang, Novi, MI (US); Ryan Abraham McGee, Ann Arbor, MI (US); Ming Lang Kuang, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 41 days.

(21) Appl. No.: 14/057,369

(22) Filed: Oct. 18, 2013

(65) Prior Publication Data

US 2015/0112525 A1    Apr. 23, 2015

(51) Int. Cl.
*B60W 10/00* (2006.01)
*B60W 20/00* (2006.01)
*B60W 10/06* (2006.01)
*B60W 10/08* (2006.01)

(52) U.S. Cl.
CPC ............... *B60W 20/40* (2013.01); *B60W 10/06* (2013.01); *B60W 10/08* (2013.01); *Y10S 903/902* (2013.01)

(58) Field of Classification Search
None
See application file for complete search history.

(56) References Cited

U.S. PATENT DOCUMENTS

| | | | |
|---|---|---|---|
| 6,856,034 B2 | 2/2005 | Peters et al. | |
| 7,206,687 B1 * | 4/2007 | Huseman | 701/102 |
| 7,640,744 B2 * | 1/2010 | Rollinger et al. | 60/605.1 |
| 7,739,016 B2 | 6/2010 | Morris | |
| 8,720,619 B2 * | 5/2014 | Falkenstein | 180/65.265 |
| 2005/0256618 A1 * | 11/2005 | Hsieh et al. | 701/22 |
| 2007/0125083 A1 * | 6/2007 | Rollinger et al. | 60/605.1 |
| 2007/0205029 A1 * | 9/2007 | Leone et al. | 180/65.2 |
| 2009/0321159 A1 * | 12/2009 | Andri | 180/65.25 |
| 2011/0276251 A1 * | 11/2011 | Kang et al. | 701/103 |
| 2013/0054063 A1 | 2/2013 | Maier et al. | |
| 2013/0325227 A1 * | 12/2013 | Whitney et al. | 701/22 |
| 2013/0325228 A1 * | 12/2013 | Whitney et al. | 701/22 |

* cited by examiner

*Primary Examiner* — Thomas Tarcza
*Assistant Examiner* — Richard Goldman
(74) *Attorney, Agent, or Firm* — David B. Kelley; Brooks Kushman P.C.

(57) ABSTRACT

A vehicle is provided with a powertrain including an electric motor, an internal combustion engine, and a turbocharger. The vehicle further includes a controller programmed to apply a variable filter to engine torque commands that are responsive to driver demand. The filter affects commands having a rate of increase greater than a predetermined threshold such that corresponding rates of increase in both engine torque and turbocharger speed are limited to respective rates less than the maximum available levels in order to reduce a surge in engine output emissions. The controller additionally issues commands for motor torque such that overall powertrain torque satisfies the driver demand.

16 Claims, 4 Drawing Sheets

HYBRID VEHICLE POWERTRAIN MANAGEMENT SYSTEM AND METHOD

TECHNICAL FIELD

The present disclosure relates to hybrid vehicles, more specifically powertrain control systems.

BACKGROUND

Hybrid vehicles are known to employ powertrains having internal combustion engines in cooperation with electric machines. The dual power source allows for smaller, more efficient engines to be used. Yet in response to certain inputs, engine transients may still occur resulting in lowered fuel efficiency and increased engine emissions output. One such input is a sudden change in demanded power or torque from the engine.

The addition of one or more turbochargers coupled with the engine presents a different set of responses to rapid changes in demanded powertrain output. There is commonly a delay from the time power is demanded to when assistance from the turbocharger is realized by the operator.

SUMMARY

A vehicle is provided with a powertrain including an electric motor, an internal combustion engine, and a turbocharger. The vehicle further includes a controller programmed to apply a filter to engine torque commands that are responsive to driver demand. The filter affects commands having a rate of increase greater than a predetermined threshold such that corresponding rates of increase in both engine torque and in turbocharger speed are limited to respective rates less than an available maximum to reduce a surge in engine output emissions. The controller additionally issues commands for motor torque such that overall powertrain torque satisfies the driver demand.

A method of limiting powertrain emissions includes allocating torque commands for each of an engine and an electric motor to satisfy a driver torque demand. The method further includes applying a filter to modify the torque command for the engine such that in response to a surge in driver torque demand, rates of increase of both engine torque and turbocharger speed are limited relative to respective available maximum rates. The method further still includes increasing the torque command for the motor by an amount equal to a value of the modification to the torque command for the engine so as to satisfy the surge in driver torque demand.

A hybrid vehicle is provided with a controller programmed to apply a low-pass filter to a torque command for an engine such that as driver torque demand increases, a corresponding rate of increase in engine torque is limited. The controller is further programmed to apply a multiplier to a torque command for a motor such that an output torque of the motor is increased by an amount equal to a quantity by which the engine torque is limited.

Certain vehicles described herein may reduce surges in a combustion fuel-to-air ratio so as to restrict the ratio to be maintained within a predetermined range about a stoichiometric fuel-to-air ratio.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
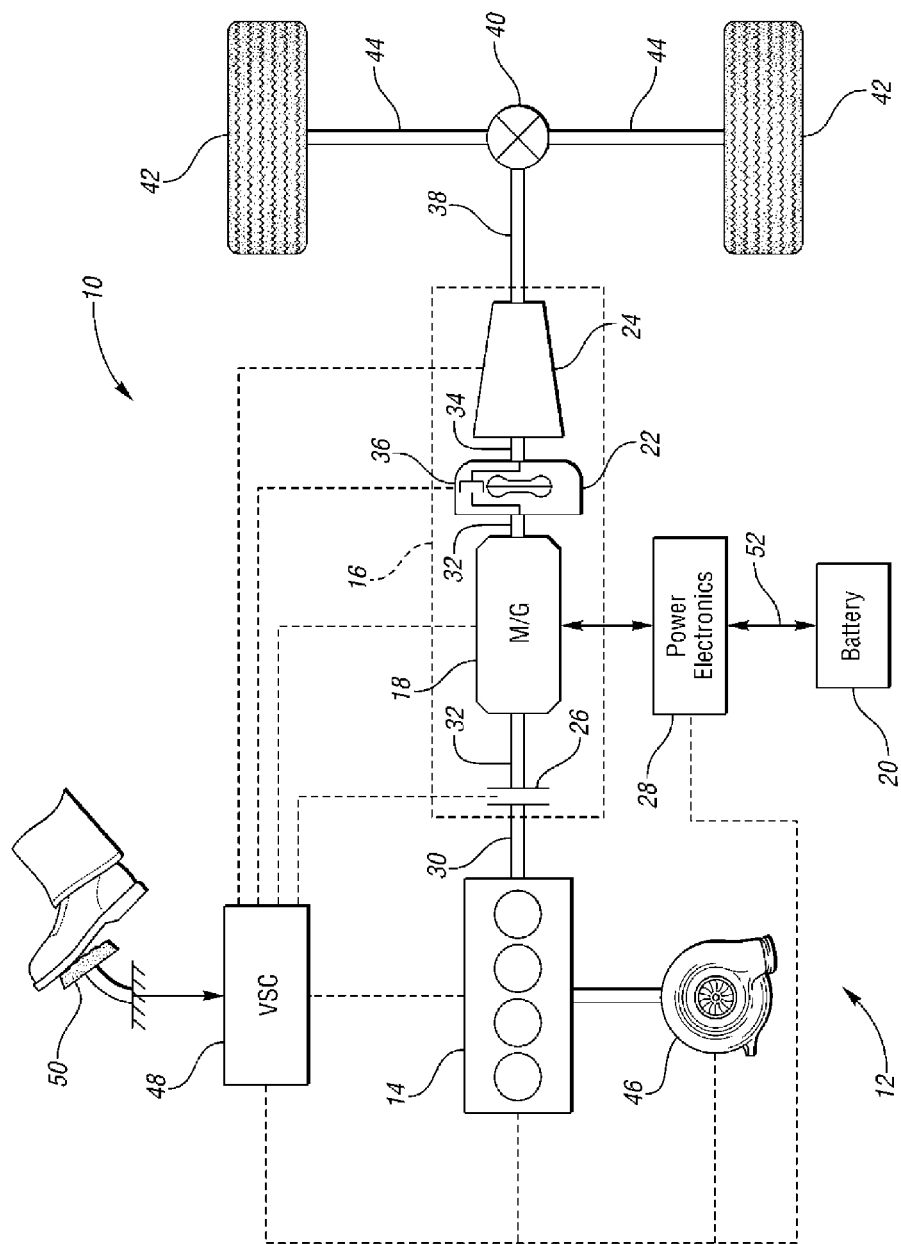
FIG. 1 is a schematic of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The vehicle 10 includes a powertrain 12. The powertrain 12 includes an engine 14 that drives a transmission 16. As will be described in further detail below, the transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both capable of providing motive power for the HEV 10. The engine 14 generally represents a power source which may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics 28 condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, when the disconnect clutch 26 is engaged, the M/G 18 may operate as a generator to convert rotational energy provided by a crankshaft 30 through M/G shaft 32 into electrical energy to be stored in the battery 20. The disconnect clutch 26 can also be disengaged to isolate the engine 14 from the remainder of the powertrain 12 such that the M/G 18 can operate as the sole drive source for the vehicle 10. Shaft 32 extends through the M/G 18. The M/G 18 is continuously drivably connected to the shaft 32, whereas the engine 14 is drivably connected to the shaft 32 only when the disconnect clutch 26 is at least partially engaged.

The M/G 18 is also connected to the torque converter 22 via shaft 30. Therefore the torque converter 22 is also connected to the engine 14 when the disconnect clutch 26 is at least partially engaged. The torque converter 22 includes an impeller fixed to the M/G shaft 32 and a turbine fixed to a transmission input shaft 34. The torque converter 22 provides a hydraulic coupling between shaft 32 and transmission input shaft 34. A torque converter bypass clutch 36 may also be provided that, when engaged, frictionally or mechanically couples the impeller and the turbine of the torque converter 22, permitting more efficient power transfer. The torque converter bypass clutch 36 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 36. In some applications, disconnect clutch 26 is generally referred to as an upstream clutch and launch clutch 36 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 38 and the transmission input shaft 34. The gearbox 24 ultimately provides a powertrain output torque to output shaft 38.

As further shown in the representative embodiment of FIG. 1, the output shaft 38 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

It should be understood that the hydraulically controlled gearbox 24 combined with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

The engine 14 may be coupled to a turbocharger 46 to provide an air intake pressure increase, or "boost" to force a higher volume of air into a combustion chamber of the engine 14. The pressure boost generally refers to the amount by which intake manifold pressure exceeds atmospheric pressure. The boost is further representative of the extra air pressure that is achieved over what would be achieved without forced induction. Related to the increased air pressure provided to the engine 14 by the turbocharger 46, a corresponding increase in the rate of fuel combustion may be achieved. The additional air pressure boost therefore allows the engine 14 to achieve additional output power, thereby increasing engine torque.

The turbocharger 46 may be driven by vehicle exhaust recycled to drive a turbine which is internal to the turbocharger 46. The rotation of the turbine builds additional pressure on air taken in, and exhausts pressurized air from the turbocharger 46 into the engine intake manifold. There is commonly a time lag between the time engine speed is increased to cause exhaust flow and the time in which a build-up of maximum pressure output is achieved by the turbocharger 46. This is in part due to the time needed for the exhaust system and turbocharger 46 to ramp up and generate the maximum available pressure boost. Turbo lag, or the time required to change turbocharger 46 power output in response to a throttle change, may be perceived by a driver as hesitation or slowed throttle response during acceleration as compared to a naturally aspirated engine. Inertia, friction, and compressor load are common contributors to turbo lag. While noticeable to varying degrees, turbo lag can be most problematic when rapid changes in power output are required.

Turbo lag additionally can vary based on the size of the turbocharger. A smaller turbocharger can provide boost more quickly and at lower engine speeds, but may not be able to provide as much boost at higher engine speeds when a larger volume of air is going into the engine. However, smaller turbochargers are also at more of a risk of spinning too quickly at higher engine speeds, when a large amount of exhaust is passing through the turbine. In contrast, larger turbochargers may have a higher available boost output, but are more prone to higher degrees of turbo lag.

The stoichiometric mixture for a combustion engine is the ideal ratio of fuel-to-air to allow all fuel to be burned within the combustion chamber of the engine with no excess air. For example, considering gasoline fuel engines, the stoichiometric fuel-to-air ratio may be about 1:15. Mixtures having a ratio greater than the ideal stoichiometric ratio are considered to be rich mixtures. Those having a lesser air-to-fuel ratio are considered lean mixtures. The vehicle 10 may be equipped with at least one oxygen sensor or other feedback loop used to monitor and control fuel-to-air ratios. The vehicle 10 may then compensate automatically for deviations from the ideal stoichiometric ratio by adjusting operating parameters in response to sensing a concentration or presence of exhaust gas oxygen or other exhaust gas components. For example, modifying a fuel volume directed to the combustion chamber may be used to adjust the fuel-to-air ratio. According to aspects of the disclosure, the vehicle 10 changes operating parameters in order to maintain the fuel-to-air ratio for the engine within a predefined range about a stoichiometric fuel-to-air ratio.

Operation states of the powertrain 12 may be dictated by a controller, such as a powertrain control unit (PCU). While illustrated as a single controller, the PCU may be part of a larger control system and may be influenced by various other controllers throughout the vehicle 10, such as a vehicle system controller (VSC) 48. Examples of such other controllers included within the VSC 48 include a brake system control module (BSCM), a high voltage battery controller (BECM), as well as other controllers in communication which are responsible for various vehicle functions. The one or more other controllers can collectively be referred to as a "controller" that commands various actuators in response to signals from various sensors. The VSC 48 response may serve to dictate or influence a number of vehicle functions such as starting/stopping engine 14, operating the M/G 18 to provide wheel torque or recharge the traction battery 20, select or schedule transmission gear shifts, etc. The VSC 48 may further include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The VSC 48 communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, the VSC 48 may communicate signals to and/or from the engine 14, the turbocharger 46, the disconnect clutch 26, the M/G 18, the launch clutch 36, the transmission gearbox 24, and the power electronics 28. Although not explicitly illustrated, those of ordinary skill in the art will recognize various functions or components that may be controlled by the VSC 48 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 36, and transmission gearbox 24, and the like. Sensors communicating input through the I/O interface may be used to indicate turbocharger boost pressure, turbocharger rotation speed, crankshaft position, engine rotational speed (RPM), wheel speeds, vehicle speed, engine coolant temperature, intake manifold pressure, accelerator pedal position, ignition switch position, throttle valve position, air temperature, exhaust gas oxygen or other exhaust gas component concentration or presence, intake air flow, transmission gear, ratio, or mode, transmission oil temperature, transmission turbine speed, torque converter bypass clutch 36 status, deceleration or shift mode, for example.

The VSC 48 also includes a torque control logic feature. The VSC 48 is capable of interpreting driver requests based on several vehicle inputs. These inputs may include, for example, gear selection (commonly implemented for example, with a driver selection of one of "PRNDL" i.e., park-reverse-neutral-drive-low), accelerator pedal inputs, battery temperature, voltage, current, and battery state of charge (SOC). The VSC 48 in turn may provide a gear select command signal to the transmission gear box in based on a torque demand based upon at least some of the above inputs.

A driver of the vehicle 10 may provide input at accelerator pedal 50 and create a demanded torque, power, or drive command to propel the vehicle 10. In general, depressing and releasing the pedal 50 generates an accelerator input signal that may be interpreted by the VSC 48 as a demand for increased power or decreased power, respectively. Based at least upon input from the pedal, the controller 48 may allocate torque commands between each of the engine 14 and/or the M/G 18 to satisfy the torque demanded by the driver. The controller 48 may also control the timing of gear shifts within the gearbox 24, as well as engagement or disengagement of the disconnect clutch 26 and the torque converter bypass clutch 36. Like the disconnect clutch 26, the torque converter bypass clutch 36 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 36 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional powered torque to turn the shaft 32. This operation mode may be referred to as a "hybrid mode" or an "electric assist mode." As mentioned above, the VSC 48 may be further operable to issue commands to allocate a torque output of both the engine 14 and the M/G 18 such that the combination of both torque outputs satisfies an accelerator 50 input from the driver.

To drive the vehicle 10 with the M/G 18 as the sole power source, the power flow remains the same except the disconnect clutch 26 isolates the engine 14 from the remainder of the powertrain 12. Combustion in the engine 14 may be disabled or otherwise OFF during this time in order to conserve fuel, for example. The traction battery 20 transmits stored electrical energy through wiring 52 to power electronics 28 that may include an inverter. The power electronics 28 convert high-voltage direct current from the battery 20 into alternating current for use by the M/G 18. The VSC 48 may further issue commands to the power electronics 28 such that the M/G 18 is enabled to provide positive or negative torque to the shaft 32. This operation mode may be referred to as an "electric only" operation mode.

In any mode of operation, the M/G 18 may act as a motor and provide a driving force for the powertrain 12. Particularly in conditions requiring a high rate of increase of powertrain torque such as vehicle takeoff from rest, the motor torque command may be augmented to provide an adequate overall powertrain torque. The M/G 18 may have an initial high output torque to supplement powertrain torque until the engine torque has achieved a maximum available torque. Once engine torque is at the maximum available torque, the motor torque output may be reduced or disabled.

Alternatively, the M/G 18 may operate as a generator to convert kinetic energy from the powertrain 12 into electric energy to be stored in the battery 20. The M/G 18 may act as a generator while the engine 14 is providing the sole propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limiting. Other configurations are contemplated that utilize selective engagement of both an engine and a motor to transmit through a transmission. For example, the M/G 18 may be offset from the crankshaft 30, an additional motor may be provided to start the engine 14, and/or the M/G 18 may be provided between the torque converter 22 and the gearbox 24. Other configurations are contemplated without deviating from the scope of the present disclosure.

Sudden increases in driver torque demand commonly cause rapid responses in engine throttle position in an attempt to increase engine torque and achieve a maximum output as quickly as possible to satisfy driver demand. A high rate of change of engine torque may in turn cause a surge in the fuel-to-air ratio. More rich burning mixtures can allow portions of unburned fuels to be exhausted from the engine 14, and lead to spikes in emissions of the vehicle as a result of rapid acceleration.

FIG. 2 depicts a series of corresponding time plots for several powertrain operating parameters. FIGS. 2A through 2E each correspond in time and show different vehicle operation parameters as they occur in response to driver demand. FIG. 2A is a plot of driver demand versus time. Curve 110 represents a driver input showing a sudden increase in driver demand represented by a step input. The step input is increased at time T0.

Figure 2A:
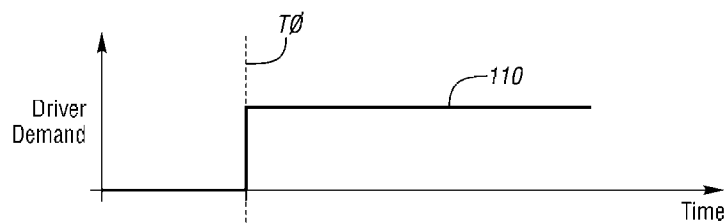
FIGS. 2A through 2E are a series of time plots showing powertrain performance parameters under a first operation mode.
Figure 2B:
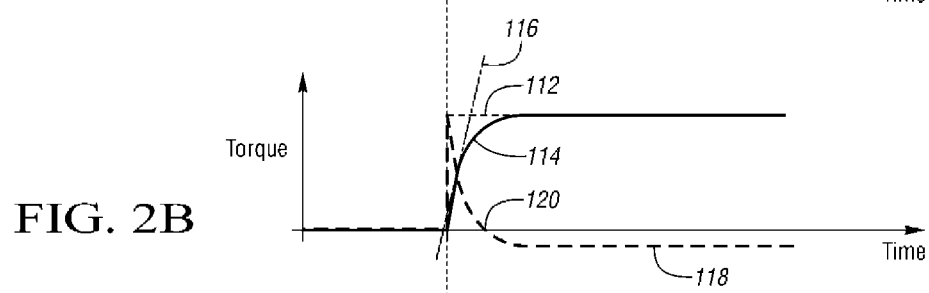

FIG. 2B is a corresponding time plot of several powertrain torque parameters. Curve 112 represents an engine torque command which increases beginning at T0 in response to the driver demand increase. It should be noted that during conventional operation, the engine torque command 112 also simulates a step increase mimicking the sudden change in driver demand. Curve 114 depicts actual engine torque output in response to the engine torque command. Since engine torque generally may not be instantaneously increased, the actual engine torque output curve 114 increases along an initial rate of change shown by slope line 116. In vehicle systems such as that of FIG. 2, the engine torque output is only limited by upper bounds of capabilities of the engine. Curve 118 represents an output torque of the motor. Generally, electric motor torque may be increased significantly faster as compared to engine torque. In this way, the motor torque 118 may increase rapidly in response to driver demand so as to supplement powertrain torque during the period in which engine torque is ramped up. The motor torque is then reduced corresponding to the increase in actual engine output torque 114. At point 120, the motor may be disabled completely and become a load on the engine and impart a negative torque, for example in a generator mode.

Figure 2C:
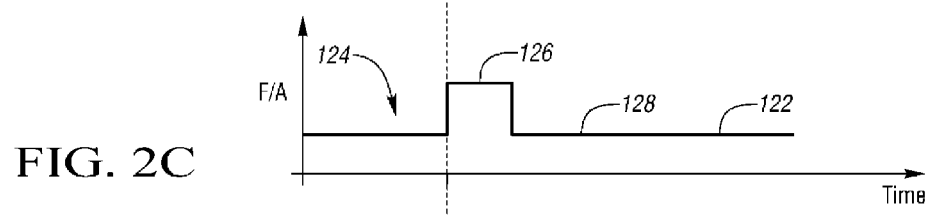

FIG. 2C is a time plot of a fuel-to-air ratio within a combustion chamber of the engine. Curve 122 represents how the ratio may be affected by sudden increases in driver demand. Region 124 depicts a stoichiometric region which is generally at a steady state. At time T0, and in response to sudden change in driver demand, there is a surge 126 in the fuel-to-air ratio causing a rich combustion condition caused by the attempt to suddenly increase powertrain torque. Once the rate of increase of engine torque reduced, the fuel-to-air ratio is returned to a steady state stoichiometric mix at 128.

Figure 2D:
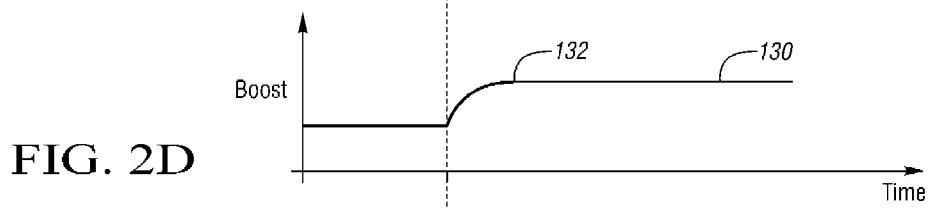

FIG. 2D is a time plot of turbocharger boost, in which curve 130 shows the response in boost pressure to a sudden increase in driver torque demand. At T0 the boost begins to ramp up as the turbocharger speed increases, until a maximum available boost is achieved at point 132. The time period between T0 and point 132 may be perceived by a driver as turbo lag as discussed above.

Figure 2E:
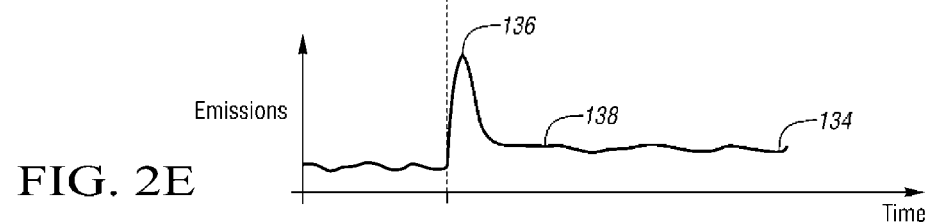

FIG. 2E is a time plot of emissions output from the engine of the vehicle. Curve 134 represents the emissions response related to the surge in the fuel-to-air ratio described above in FIG. 2C. Also related to the attempt to rapidly increase engine torque, there is a surge 136 in emissions. Corresponding to the changes in fuel and air mixture, the emissions return to a generally steady state at 138 once the engine achieves full torque and is operating with a generally steady state output.

Figure 3:
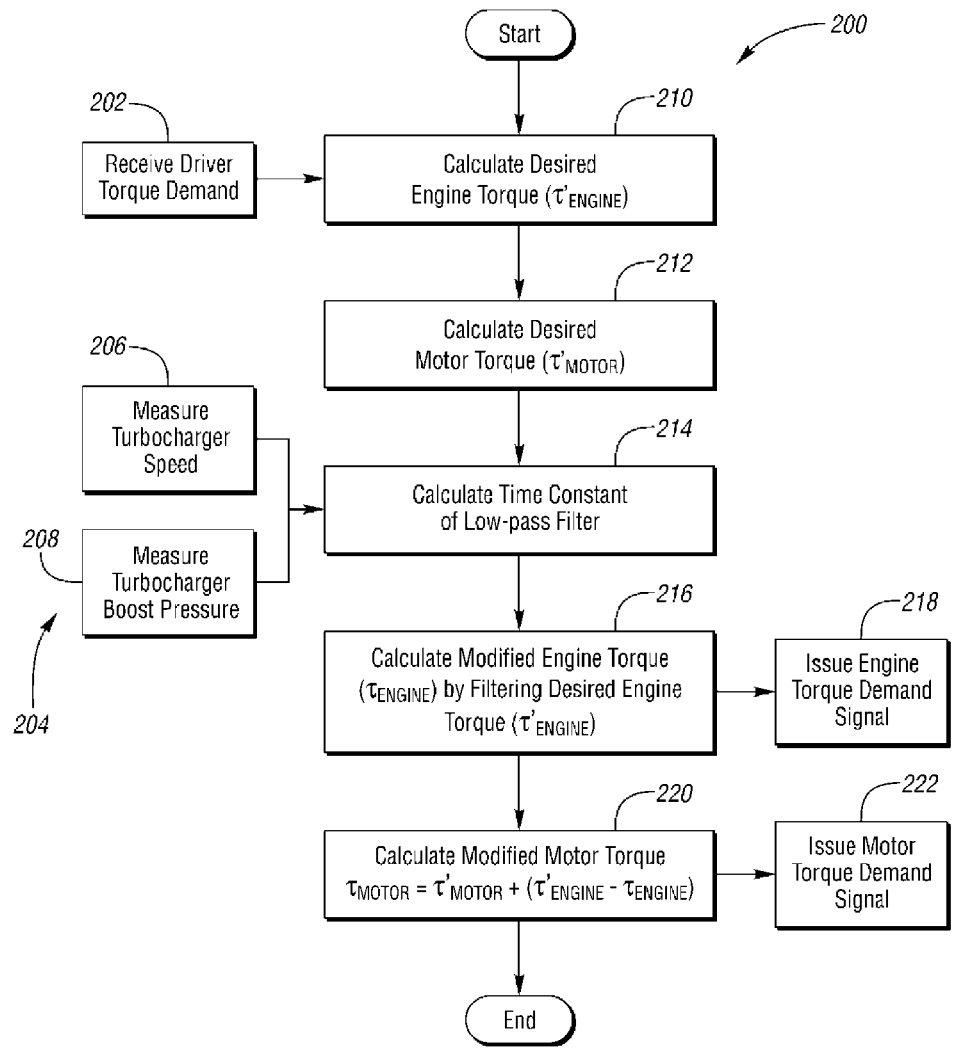
FIG. 3 is flow chart corresponding to a method of the present disclosure.

An algorithm is provided to reduce emissions by preventing a surge in fuel-to-air mixture ratio that is commonly responsive to a sudden increase in driver torque demand. FIG. 3 depicts a method 200 representative of an embodiment of torque control logic of the VSC. The torque control logic may use as inputs the driver torque demand 202 as well as operating parameters 204 of a turbocharger. Step 206 may include sensing a turbocharger rotational speed. Similarly, step 208 may entail sensing a turbocharger boost pressure 208.

Initially the method 200 may include allocating desired torque commands between the engine and the motor at steps 210 and 212 to satisfy a driver demand. The initial allocation may determine hybrid operation based on a maximum available engine torque and a supplemental motor torque to meet the driver torque demand 202. As discussed above, during instances of rapid torque increases, employing the maximum available engine torque may cause surges in fuel-to-air ratio and/or emissions output by the engine. Accordingly, method 200 includes the application of a variable low-pass filter to the command for engine torque output.

Step 214 includes calculating a variable time constant for the low-pass filter. The time constant may vary based on at least one of the turbocharger speed sensed at step 206 and the turbocharger pressure boost sensed at 208. In this way, the effect of the filter is continually changed as the turbocharger ramps up to its full operating capacity. The time constant may further have a functional relationship to at least one of the above turbocharger parameters. For example, the controller may have a stored lookup table dictating predetermined time constant values, or perform mathematical computations to derive the time constant of the filter real-time.

At step 216 the low-pass filter is applied to the desired engine torque command calculated at 210. Employing the time constant determined at step 214, the filter operates to limit the rate of increase of commands for engine torque in spite of sudden increases in driver demand. Due to the variable nature of the filter time constant, the amount of the command signal which is filtered away changes as the turbocharger builds up to maximum output. The application of the filter to the desired engine torque at step 216 produces a modified engine torque which may be a reduced torque ultimately limiting the rate of increase of actual engine torque output. The filter effectively reduces a command for engine torque having a rate of increase greater than a predetermined threshold. At step 218 a modified torque command is issued to the engine based on the filtered initial desired engine torque. Although a low-pass filter is described herein, it should be appreciated that alternative filter topologies may be suitable to modify engine torque commands to reduce emissions as well as for other purposes. Other such filter types may also be provided with variable time constants as described above.

In order for the vehicle powertrain to fully satisfy driver torque demand, the motor torque may need to be increased beyond the initial desired motor torque to adequately supplement the powertrain output. At step 220, a modified motor torque is calculated based in part on any shortfall in engine torque stemming from the filtered torque command. The modified motor torque may be increased by an amount equal to the quantity by which the engine torque is limited in the filtering step 216. Alternatively, a multiplier may be applied to the motor torque command signal to achieve a similar effect.

Figure 4A:
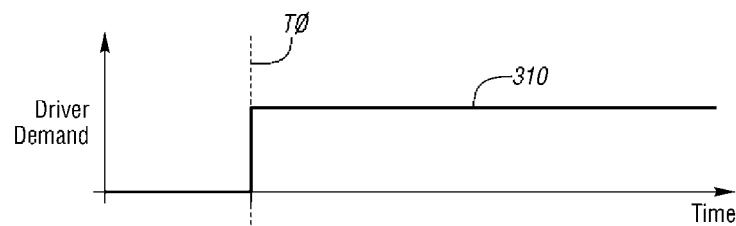
FIGS. 4A through 4E are a series of time plots showing powertrain performance parameters according to the method of FIG. 3.

The control algorithms described herein improve vehicle operating performance in several ways. Reduced emissions output by the engine during rapid changes in torque output may be achieved. Additionally, the effects of turbo lag may be at least partially avoided by metering the increase in engine torque. FIG. 4 depicts a series of corresponding time plots for several powertrain operating parameters. FIGS. 4A through 4E each correspond in time to each other and show similar vehicle operation parameters to FIG. 2 as they occur in response to driver demand. FIG. 4A is a plot of driver demand versus time. Curve 310 represents a driver input showing a sudden increase in driver demand represented by a step input. The step input is increased at time T0.

Figure 4B:
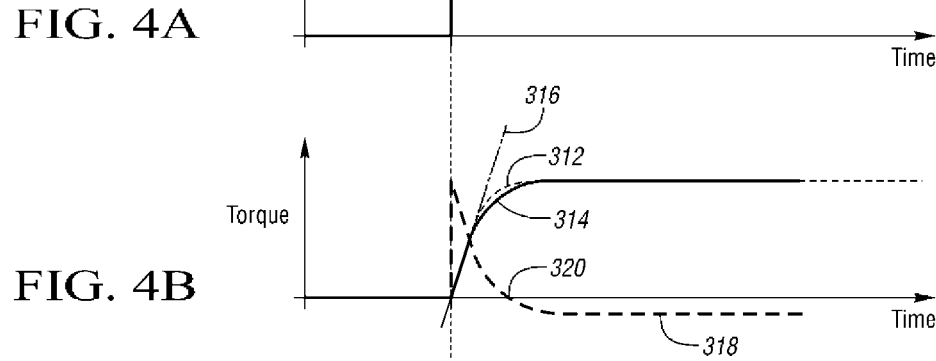

FIG. 4B is a corresponding time plot of several powertrain torque parameters. Curve 312 represents an engine torque command which increases beginning at T0 in response to the driver demand increase. Compared to conventional operation, the rate of change of the engine torque command represented by curve 312 is limited below the full available torque of the engine in spite of a sudden increase in driver demand. Curve 314 depicts actual engine torque output in response to the engine torque command 312. Related to the limited rate of increase in the engine torque command 312, the actual engine torque output curve 314 increases along an initial rate of change shown by slope line 316. It should be noted that the actual engine output is capable of more closely adhering to the metered engine torque command as compared to a conventional system. Curve 318 represents an output torque of the motor. As in other cases, the motor torque 318 is increased rapidly in response to driver demand to supplement powertrain torque. However, a higher output motor torque is maintained over a longer period to allow the engine to build torque more slowly. At point 320 the motor is disabled and may begin to impart a negative torque on the powertrain.

Figure 4C:
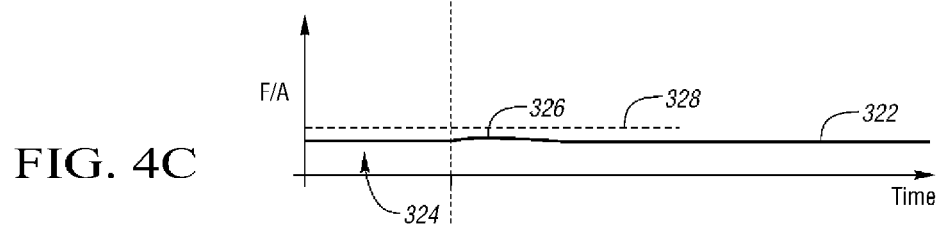

FIG. 4C is a time plot of a fuel-to-air ratio within a combustion chamber of the engine. Curve 322 represents how the ratio may vary in response to sudden increases in driver demand. Region 324 depicts a stoichiometric region which is generally at a steady state. At time T0, and in response to sudden change in driver demand, there may be some amount of variance in fuel-to-air ratio at 326. However, systems according to this disclosure may be configured to maintain the fuel-to-air ratio within a predefined range 328 about the stoichiometric fuel-to-air ratio. In this way, the combustion fuel-to-air ratio is held closer to a steady state condition in spite of a surge in driver demand.

Figure 4D:
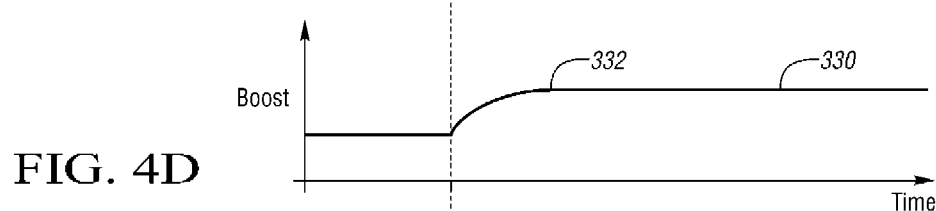

FIG. 4D is a time plot of turbocharger boost, where curve 330 shows the response in boost pressure to a sudden increase in driver torque demand. At T0 the boost begins to ramp up as the turbocharger speed increases, until a maximum available boost is achieved at point 332. Although not depicted in the plot, the rate of increase of the turbocharger speed may be generally constant as an effect related to limited increase in engine torque. The turbocharger speed may increase linearly and therefore be limited below maximum available during certain portions of the ramp up. Yet, the turbocharger may still reach the maximum turbocharger output after a similar duration as compared to other systems. Because the degree of supplementation by the motor may be based on the state of the turbocharger, the effect of turbo lag is lessened as it is perceived by a driver.

Figure 4E:
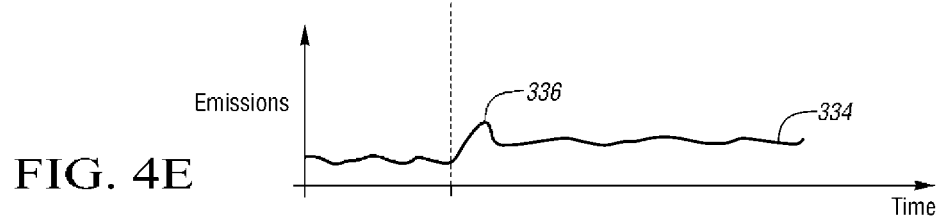

FIG. 4E is a time plot of emissions output from the engine of the vehicle. Curve 334 represents the emissions output response to sudden increase in driver demand. Since a surge in the combustion fuel-to-air ratio is avoided, emissions are similarly able to be held at a more steady condition. There may still be some fluctuation in response to aggressive vehicle acceleration as noted at location 336, but surges in engine output emissions may largely be limited as discussed herein.

The present disclosure provides representative control strategies and/or logic that may be implemented using one or more processing strategies such as event-driven, interrupt-driven, multi-tasking, multi-threading, and the like. As such, various steps or functions illustrated herein may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but it is provided for ease of illustration and description.

The control logic may be implemented primarily in software executed by a microprocessor-based vehicle, engine, and/or powertrain controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
  a powertrain including an electric motor, an internal combustion engine, and a turbocharger; and
  a controller programmed to
    apply a filter to a command for engine torque responsive to driver demand such that for commands having a rate of increase greater than a predetermined threshold, corresponding rates of increase in both an engine torque and a turbocharger speed are limited to respective rates less than maximum available rates to reduce a surge in unburned fuel portions emitted from the engine, and issue a command for motor torque such that a powertrain torque satisfies the driver demand.

2. The vehicle of claim 1 wherein the filter is a low-pass filter and wherein a time constant of the filter varies as a function of at least one of the turbocharger speed and a turbocharger boost pressure.

3. The vehicle of claim 1 wherein the rate of increase of turbocharger speed is generally constant.

4. The vehicle of claim 1 wherein the command for motor torque is increased by an amount equal to a difference between the command for engine torque before and after application of the filter.

5. The vehicle of claim 1 wherein the controller applies the filter such that fuel portions are burned by the engine at a generally constant rate in spite of a surge in the driver demand.

6. The vehicle of claim 5 wherein the controller is further programmed to maintain a fuel-to-air ratio for the engine within a predefined range about a stoichiometric fuel-to-air ratio.

7. A method of limiting powertrain emissions comprising:
allocating torque commands for each of an engine and an electric motor to satisfy a driver torque demand;
applying a low-pass filter to modify the torque command for the engine;
modifying the torque command for the engine such that in response to a surge in driver torque demand, rates of increase of both engine torque and turbocharger speed are limited to less than respective available maximum rates; and
increasing the torque command for the motor by an amount equal to a value of the modification to the torque command for the engine so as to satisfy the surge in driver torque demand.

8. The method of claim 7 further comprising varying a time constant of the low-pass filter based on at least one of a turbocharger boost and a turbocharger speed.

9. The method of claim 7 wherein limiting the rate of increase of the engine torque further comprises maintaining a generally constant fuel-to-air ratio for combustion of the engine.

10. The method of claim 9 further comprising reducing the torque command for the motor at a rate that is commensurate with the rate of increase of the engine torque.

11. The method of claim 7 further comprising maintaining a combustion fuel-to-air ratio of the engine within a threshold range about a stoichiometric fuel ratio in spite of the surge in driver torque demand.

12. A vehicle comprising:
a controller programmed to
apply a variable filter to a rate of increase of a torque command for an engine such that as driver torque demand increases, a corresponding rate of increase in engine torque is limited, and
apply a multiplier to a torque command for a motor such that an output torque of the motor is increased by an amount equal to a quantity by which the engine torque is limited.

13. The vehicle of claim 12 further comprising a turbocharger configured to provide an air pressure boost to the engine, wherein the filter includes a variable time constant that changes as a function of at least one of a turbocharger boost pressure and a turbocharger speed.

14. The vehicle of claim 13 wherein an application of the filter limits a rate of change of at least one of a turbocharger boost pressure and a turbocharger speed to less than a predetermined threshold.

15. The vehicle of claim 12 wherein the controller is further programmed to reduce a surge in a fuel-to-air ratio for the engine in response to an increase in driver torque demand.

16. The vehicle of claim 15 wherein the controller is further programmed to maintain the fuel-to-air ratio for the engine within a predefined range about a stoichiometric fuel-to-air ratio.

* * * * *